United States Patent Office 3,845,230
Patented Oct. 29, 1974

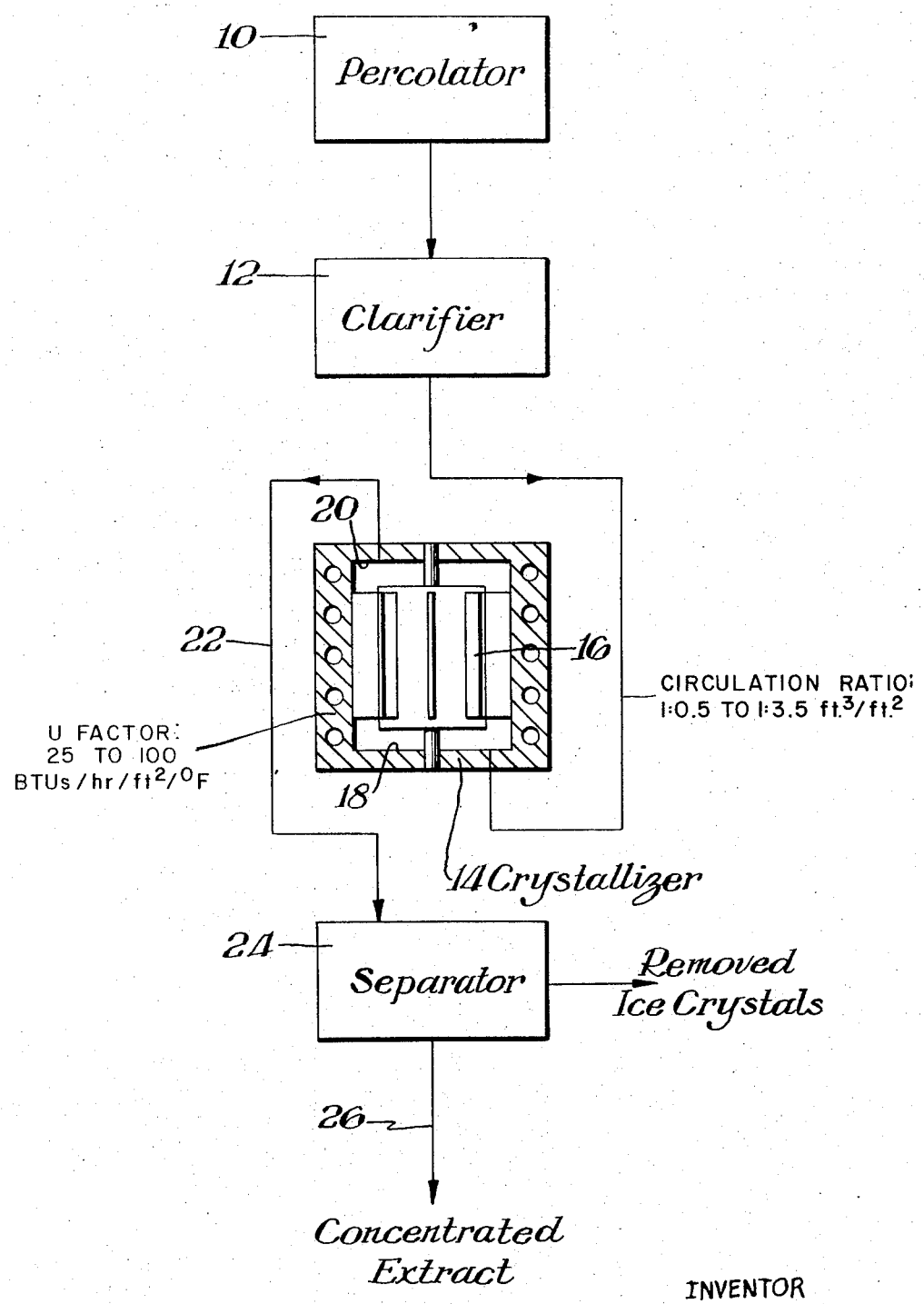

3,845,230
FREEZE CONCENTRATION OF INSTANT COFFEE
Daniel E. Dwyer, Jr., Westbury, N.Y., assignor to General Foods Corporation, White Plains, N.Y.
Continuation of abandoned application Ser. No. 846,805, Aug. 1, 1969. This application Apr. 3, 1972, Ser. No. 240,867
Int. Cl. A23f 1/08; B01d 9/04
U.S. Cl. 426—384                10 Claims

ABSTRACT OF THE DISCLOSURE

Clarified coffee extract is freeze concentrated under conditions which provide a relatively uniform and large ice crystal ranging from about 10 to 80 mils in size. The ratio of crystallizer volume to refrigerated heat exchange surface ranges from 1:0.5 to 1:3.5 and is advantageously 1:1. The "U" factor (Btu's per hour, per square foot refrigerated heat exchange surface area, per ° F.) is between 25 to 100 and advantageously 50. The delta T (temperature differential) between extract and refrigerated heat exchange wall, for concentrations of from 30–50% solids and usually 35–45% solids by weight of extract varying in ice point from 29.4° F. (−2° C.) to 19.4° F. (−7° C.), ranges approximately between 25° F. and 60° F. and is advantageous in the neighborhood of 35° F. The extract is retained in the crystallizer, which is of the scrape wall type, from 1 to 6 hours and usually from 1.5 to 3.5 hours. The slurry of extract and crystals from the crystallizer is centrifuged in consecutive load and spin cycles to separate them and to minimize the coffee solids retained in the crystals. The slurry is first spun at a relatively lower speed in a loading spin cycle, ranging approximately from 400 to 800 r.p.m. and developing forces ranging approximately from 100 to 400 G's. The ice cake, thus built up to a thickness of from 0.5 to 2 inches in approximately 3–5 minutes, has a solids content of approximately 25% by weight. The ice cake is washed by dilute extract or water during the terminal portion of the loading spin cycle to reduce the solids content to about 5 to 10%. Then the ice cake is final spun at speeds in excess of 800 r.p.m. to create elevated G forces in excess of 500 G's which deplete the ice cake solids content to less than 5 to 10% and usually in the neghborhood of 1 to 3%.

CROSS-REFERENCE TO RELATED APPLICATION

This is a continuation of application Ser. No. 846,805, filed Aug. 1, 1969 now abandoned.

BACKGROUND OF THE INVENTION

It is highly advantageous to concentrate coffee extract prior to freeze drying it. This minimizes the amount of water vapor that must be removed, generally facilitates freeze drying and heightens its efficiency. Freeze concentration is a method of concentrating the extract, which removes water in the form of ice crystals. It is important to minimize the amount of coffee solids removed from the extract with the crystallized ice and to facilitate such removal. An object of this invention is to provide a process of freeze concentration, crystallization and separation which minimizes the amount of coffee solids retained in the ice crystals removed from the concentrated extract and which facilitates the efficient removal of coffee solids therefrom.

SUMMARY OF THE INVENTION

Coffee extract having an original solids content of 20% to 35% and usually 21 to 25% is concentrated to a solids content ranging from 30–50% and usually 35–45% by growing relatively large and uniform ice crystals ranging in size approximately from 10 to 80 mils. Such crystals are grown by operating a crystallizer (for example of the scraped wall type) in accordance with the following parameters:

(a) The ratio of crystallizer volume to refrigerated heat exchange surface area ranges from 1:0.5 to 1:3.5, more particularly from 1:0.75 to 1:1.50 and is for example 1:1;
(b) "U" factor of between 25 to 100, more particularly from 35 to 75 and is for example 50;
(c) Delta T ranging approximately between 25° F. to 60° F., more particularly 30 to 40° F. and is for example 35° F.;
(d) Residence time from 1 to 6 hours and more particularly from 1.5 to 3.5 hours;
(e) Gentle agitation; and
(f) Extract temperature of from about 29.4° F. (−2° C.) to 19.4° F. (−7° C.) during crystallization.

Crystals formed in this manner provide an ice cake of remarkably high permeability and porosity, which facilitate maximum removal of coffee solids from ice cake in separation accomplished in a centrifuge. Such separation is advantageously accomplished in three phases including a relatively lower speed loading spin cycle and a higher speed terminal cycle. The loading spin develops G forces from 100 to 400 G, which are attainable at speed ranging aproximately from 400 to 800 r.p.m. A highly porous and permeable ice cake from ½ to 2 inches in thickness, having a coffee solids content of about 25% by weight, is thus built up in about 3–5 minutes. The ice cake is washed in the second phase (which occurs during the latter part of the load cycle) by dilute extract or water to bring it solids content down to about 5–10% by weight. It is then final spun at high G forces in excess of 500 G (which are attainable at speeds in excess of 800 r.p.m.) to bring the coffee solids content to less than 5% by weight of optimumly in the neighborhood of from 1 to 3% by weight. Such crystallization and separation concentrates the extract to a solids content ranging from 30 to 50% and usually to 35–45% by weight.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single figure is a schematic diagram of a process for preparing coffee extract which is an embodiment of this invention.

DESCRIPTION OF THE PREFERRED EMBODIMENTS

A coffee extract having a solids content of from 20 to 30% by weight is derived from a suitable means, such as percolator 10. Percolator 10 is for example operated at temperatures between 150 and 210° F. and provides typical coffee extract having a solids content of approximately 21 to 25% by weight. The percolated extract advantageously has its relatively insoluble solids such as waxes, tar and gums removed by a clarifying system 12 to avoid fouling the surfaces of subsequent apparatus. System 12 is for example of the low temperature type which chills to below ambient room temperature and centrifuges under positive head pressures ranging from 20 to 80 p.s.i.g. to minimize foaming The clarified extract then passes to crystallizer 14 for freeze concentration. Crystallizer 14 is any suitable heat exchanger in which the extract is frozen to form large discrete crystals in the body of the liquid and which is operable under the following parameters. It is of the scraping blade type in which crystal nuclei are removed from the heat exchanger wall and thus individually grow within the liquid body. Discrete water ice crystals are grown to a size approximately from 10 to 80 mils within the crystallizer under the following parameters. These parameters include a temperature differential which grows a limited number of nuceli to a relatively large size in agitated areas of supercooled liquid. A freezing or crystallizer retention time of approximately 1 to 6 and more particularly from 1.5 to 3.5 hours provides a particularly rich concentrate of mother liquor containing substantially large, readily separable, relatively uniformly large and coarse ice crystals which may be readily pumped and handled.

Crystallizer 14 is designed to have a comparatively high ratio of volume of extract to refrigerated heat exchange surface. Residence time of extract in the crystallizer will be such as to assure gradual development of crystals in the extract at and in the vicinity of the refrigerated heat exchanger wall. Extract is subjected to a quiescent agitation by stirrer 16 in continuous positive scraping contact with the heat exchanger wall. Crystals, initially almost frost-like in dimension, form and serve to nucleate a comparatively large and grossly spherical water ice crystal in the body of the liquid. Generation of such crystals is induced by employing a slow feed rate, for example approximately 6 to 21 quarts per minute, while maintaining refrigerant in heat exchange relationship with the charged material in the crystallizer at temperatures at or below the ice point for the mother liquor solids concentration desired, which generally range between 29.4° F. (−2° C.) and 19.4° F. (−7° C.).

Residence time of extract in the crystallizer exceeds one hour and commonly is in the neighborhood of one and one-half to three and one-half hours. The ratio of crystallizer volume or the body of extract to the refrigerated heat exchange surface area is typically 1:1 and may range from 1:0.5 to 1:3.5 or more particularly from 1:0.75 to 1:1.50 thereby assuring a large volume of charged material, which when crystallized over a protracted period of time develops the desired large water ice crystals. Of consideration in this respect is the "U" factor, which is the amount of B.t.u.'s per hour, per square foot of refrigerated heat exchange surface area, per degrees F. Crystallizer 14 is designed and operated so that a "U" factor of between 25 to 100, more particularly from 35 to 75, and typically 50 is employed. This assures that ice crystals will be generated and grown at a fairly slow rate, thereby allowing currents of agitated supercooled extract to grow progressively larger crystals with a comparatively uniform final crystal size. On the other hand, the "U" factor is not so low as to occasion an impractical and prolonged holdup time in crystallizer 14.

Desired initiation of water ice crystals in supercooled extract is promoted by a heat exchanger having a crystallizing tank wall which is virtually wiped or scraped clean continuously so as to maximize heat transfer efficiency. The delta T (temperature differential) between extract and refrigerated heat exchanger or crystallization wall within the aforementioned parameters varies with the depth of extract in crystallizer 14. The extract per se becomes richer from the inlet point at the low extremity 18 of crystallizer 14 as the extract is transferred upwardly and eventually decanted at the top 20 of crystallizer 14 in the enriched mother liquor phase at solids contents ranging from 30% to 50% and commonly 35% to 45%. Mother liquor thus varies in ice point from 29.4° F. (−2° C.) to 19.4° F. (−7° C.) and higher as the extract concentration rises in crystallizer 14. Ultimately, water ice crystals collect as a floating slurry cap anywhere from two to four inches at the center, to two feet in depth at the perimeter. This floating cap is characterized by the aforesaid relatively uniform particle size distribution. Extract is agitated at a constant gentle stirring so as not to fracture or interfere with growth of coarse crystals.

In following the foregoing design and operating parameters, a delta T is practiced ranging generally between 25° F. and 60° F., more particularly 30° F. to 40° F. and commonly in the neighborhood of 35° F. Delta T in this application is a variable expression depending upon the solids content of the liquor being crystallized, which in turn depends upon the soluble solids content thereof.

Throughout crystallization, agitator 16 continually dislodges nucleating crystals from the vessel walls by means of a scraper of suitable material, such as rubber. The crystallizer tank may be made of any common sanitary and non-reactive metallic surface, such as stainless steel. Extract is retained in the crystallizer for a period of 1 to 6 hours and usually from 1.5 to 3.5 hours.

Also throughout crystallization, extract is positively displaced in a substantially oxygen-free environment. Water ice crystals grown over the foregoing residence time ascend in the body of extract liquor, which is for all practical purposes comparatively foam-free and drawn off as an enriched readily pumped slurry.

Extract slurry is delivered through line 22 at a temperature in the neighborhood of less than 29.4° F. (−2° C.) and usually in excess of 19.4° F. (−7° C.). Extract slurry is delivered, for example through vibratory hoppers and feed pumps (not shown) to separator 24, which is for example a basket-type batch centrifuge. A batch type centrifuge provides liquor separation with low occlusion of soluble solids in the centrifuged ice cake. The extract is batch loaded into the centrifuge which undergoes a loading spin cycle developing G forces preferably not in excess of 400 G and at least 100 G. This is achieved by operating the centrifuge rotor at an r.p.m. in the neighborhood of 400 to 800 r.p.m. The coarse water ice crystals are built up into a cake serving as a filter medium of high porosity and permeability, which is accordingly spun to generate a stable ice structure during which part of the mother liquor is discharged through outlet line 26. Preferably, the centrifuge is operated three to five minutes and for a period of time sufficient to develop an ice cake thickness in the neighborhood of one-half to 2 inches, preferably about one and one-half inches. The duration of the spin cycle is dependent upon extract concentration, which preferably is 35% to 45% soluble solids by weight. The ice cake then usually has a solids content of about 25% by weight.

During the latter part of the loading spin cycle, wash liquor is caused to flow through the ice cake and thereby washes the occluded solids into the discharge line. The remaining soluble solids of about 25% may be recovered by washing either through the use of dilute extract or wash water, which is fed through the cake during the latter part of the loading spin cycle, thereby increasing solids recovery.

Thereafter the centrifuge is subjected to a final spin cycle at an elevated G force in excess of 500, attained by spinning in excess of 800 r.p.m. whereby additional mother liquor is freed from the cake and the cake is further depleted of occluded soluble solids. The ice cake solids content after this final spin is generally less than 5% to 10% and more usually in the neighborhood of 1% to 3% by weight. Finally, the centrifuged ice cake is plowed from the centrifuge and discharged through other lines (not shown) for example to heated melt tanks (not shown). The melt ice liquor may be delivered to an evaporator (not shown) for concentrating the liquor to a solids content in the neighborhood of 35% to 45%. The concentrated liquor may be directed back into the main stream of the process described herein.

For some applications, it may be desirable to further concentrate the extract thereby optimizing utilization of subsequent drying equipment. In such applications, it may be practicable to further concentrate extract to as high a solids content as 60% by weight. This may be accomplished, for example, by a higher heat exchange rate scrape wall heat exchanger system, such as a Votator-type crystallizer (not shown). This secondary crystallizer is operated at high heat exchange rates as well as scraping rates and thus functions to generate fine ice crystals with a high delta T and brief residence time in its heat exchanger barrels. The extract discharging therefrom is fed by pump to a basket-type centrifuge of the same type previously described and also operated as described. Ice from the centrifuge may also be discharged into a melt ice liquor tank for ice concentration as aforesaid.

Generally, it is preferred not to employ a second freeze concentration system of the type just described above and instead to prepare a mother liquor of high solids concentration by the single crystallization previously described, thereby achieving a target mother liquor of between 35% and 45% soluble solids by weight. However, where a feed of lower soluble liquor concentration is employed, the secondary high heat exchange rate scrape wall heat exchange system may be employed as desired to increase soluble solids content to within the aforesaid range and to as high as 60% by weight.

Concentrated extract at a solids content of between 35% to 50% by weight is held for a period less than three hours and commonly less than two hours and is then delivered to the next phase of instant coffee production, which for example includes a belt freezing system of the type shown in U.S. Pat. 3,253,420. The frozen pieces of extract from the aforementioned belt freezing system may be broken up and dried in a freeze drying unit of suitable type to provide ultimate instant coffee product.

What is claimed is:

1. A continuous process of freeze concentrating coffee extract in a single pass through a heat exchanger to 35–50% solids content comprising the steps of obtaining relatively unconcentrated coffee extract having a solids content of approximately 20–35% by weight, freezing ice crystals within the body of said extract by slowly continuously feeding the extract at the lower portion of a vertical cylindrical heat exchanger for upward flow therein, the said heat exchanger having a ratio of volume to heat exchanger surface of 1:0.5 to 1:3.5 ft.$^3$/ft.$^2$ and a height greater than its diameter, and subjecting the extract while it is maintained at or below the ice point thereof to gentle agitation by stirring means in continuous positive scraping contact with a refrigerated heat exchanger wall in an oxygen-free environment under conditions which initially form a nucleating frost on the wall and wherein the frost is thereafter displaced from and thus cleaned from the wall and is redistributed by an agitator blade in the agitated body of extract to assure gradual development of ice crystals of increasing size over a residence time of at least one hour, thereby providing relatively large and uniform grossly spherical ice crystals ranging approximately from 10 to 80 mils in size in a mother liquor of 35% to 50% solids concentration, said conditions including a "U" factor (B.t.u.'s/hr./ft.$^2$/° F.) of 25 to 100 and a delta T approximately between 25° F. to 60° F. across the heat exchange wall and the extract whereby said crystals and extract rise gradually in the heat exchanger and said ice crystals collect as a floating slurry cap of uniform coarse ice crystals to provide an ice cake of high permeability and porosity for facilitating removal of coffee solids therefrom; continuously removing enriched mother liquor and floating ice at the upper extremity of the heat exchanger; and centrifugally separating the concentrate from said crystallized extract by filtering said concentrated coffee solids through the ice produced.

2. A process as set forth in Claim 1 wherein said freezing of said crystals occurs in a period of from about one to six hours.

3. A process as set forth in Claim 1 wherein said freezing of said crystals occurs over a period of from about 1 to 6 hours.

4. A process as set forth in Claim 1 wherein said freezing of said crystals occurs over a period of from about 1.5 to 3.5 hours.

5. A process as set forth in Claim 1 wherein said ratio ranges approximately from 1:0.75 to 1:1.50.

6. A process as set forth in Claim 1 wherein said concentrated extract is centrifuged in a low speed loading phase and a higher speed terminal phase.

7. A process as set forth in Claim 6 wherein said loading phase develops 100 to 400 G forces and said terminal phase develops G forces over 500.

8. A process as set forth in Claim 1 wherein said "U" factor ranges approximately from 35 to 75.

9. A process as set forth in Claim 1 wherein said delta T ranges approximately from 30° to 40° F.

10. A process as set forth in Claim 1 wherein the temperature of said extract during crystallization ranges from about 29.4° F. to 19.4° F.

References Cited

UNITED STATES PATENTS

| | | | |
|---|---|---|---|
| 2,119,182 | 5/1938 | Schuftan et al. | 62—58 |
| 3,333,436 | 8/1967 | Johnson et al. | 62—58 |
| 3,347,058 | 10/1967 | Svanoe | 62—58 |
| 2,657,555 | 11/1953 | Wenzelberger | 62—58 X |
| 3,335,575 | 8/1967 | Hedrick | 62—58 |
| 3,283,522 | 11/1966 | Ganiaris | 62—58 |
| 3,404,007 | 10/1968 | Muller | 99—71 |
| 3,381,302 | 4/1968 | Reimus et al. | 99—71 |
| 3,012,409 | 12/1961 | Ashley | 62—58 |
| 3,070,969 | 1/1963 | Ashley et al. | 62—58 |

OTHER REFERENCES

Sivetz, Vol. II, pp. 14–21, Coffee Processing Technology, 1963, AVI. Pub. Company, Inc.

NORMAN YUDKOFF, Primary Examiner

U.S. Cl. X.R.

62—58; 426—49D, 193